US006474546B1

(12) United States Patent
Niizuma

(10) Patent No.: US 6,474,546 B1
(45) Date of Patent: Nov. 5, 2002

(54) METHOD FOR CONTROLLING BILL-PROCESSING MACHINE

(75) Inventor: Nobuyuki Niizuma, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/479,881

(22) Filed: Jan. 10, 2000

(30) Foreign Application Priority Data

Jan. 11, 1999 (JP) .......................................... 11-004439

(51) Int. Cl.[7] ................................................ G06F 17/60
(52) U.S. Cl. ........................................ 235/379; 209/534
(58) Field of Search ................................ 235/379, 381, 235/385, 475, 476, 478, 483; 209/534

(56) References Cited

U.S. PATENT DOCUMENTS 4,830,742 A * 5/1989 Takesako .................... 209/534
5,000,322 A * 3/1991 Goi ............................ 209/534
5,687,963 A * 11/1997 Mennie ...................... 271/119
5,900,607 A * 5/1999 Awatsu et al. .............. 235/379
6,021,883 A * 2/2000 Casanova et al. ........... 194/217

* cited by examiner

*Primary Examiner*—Michael G. Lee
*Assistant Examiner*—Ahshik Kim
(74) *Attorney, Agent, or Firm*—Kanesaka & Takeuchi

(57) ABSTRACT

A bill-processing machine is controlled to determine an amount of housed bills as required. A number of types of the bills mixed with a dummy bill for close inspection are housed in a single bill housing and the bills in the bill housing are circulated during output and close inspection. When a close inspection instruction is issued, the dummy bill is detected while the bills in the bill housing are being circulated. During the close inspection from the detection of the dummy bill until the dummy bill is detected again, the bills in the bill housing are sequentially delivered and subjected to output-money identification. The count in a bill counter for the corresponding money type in a close inspection counter is increased depending on the determined money type in order to determine the amount of the bills housed in the bill housing. Since the single circulatory bill housing is used, the size of the machine can be reduced.

14 Claims, 16 Drawing Sheets

METHOD FOR CONTROLLING BILL-PROCESSING MACHINE

BACKGROUND OF THE INVENTION AND RELATED ART STATEMENT

The present invention relates to a method for controlling a bill-processing machine, and in particular, to a method for controlling a bill-processing machine that enables the amount of money existing in the bill-processing machine to be determined during normal operation or upon shifting of a register operator. The bill-processing machine is suitable for a machine, such as a change unloading machine, that is used at a register of a supermarket or convenience store to enable received bills to be housed therein, while enabling the housed bills to be reused as change.

In recent years, bill-processing machines (change unloading machines) have been introduced into supermarkets and convenience stores together with coin processing machines. The bill-processing machines are connected to a higher apparatus, such as a POS (Point Of Sales) system, to enable received bills to be reused as change.

In general, the bill-processing machine has a function for mechanically receiving a loaded bill, accumulating and housing the bill in a bill housing, and sending input money information to an external higher apparatus or in response to a change unloading request from the external higher apparatus, unloading a corresponding amount of bills from the bill housing as change.

Such bill and coin processing machines are introduced in order to automate money loading and unloading operations to reduce the burden of a register operator who must handle cash, while increasing the efficiency of a settlement task and eliminating calculation errors.

FIG. 13 is an explanatory side view for showing an internal configuration of a conventional bill-processing machine. The illustrated bill-processing machine is called a "circulatory bill-processing machine" that classifies input bills into three money types: 1,000 yen, 5,000 yen, and 10,000 yen, and that delivers housed bills as change. The bill-processing machine comprises an input port 1 through which bills are input, an input-money identification section 2 for identifying the loaded bills, exclusive housings 3*a* to 3*c* for the respective money types in which the input bills are housed, switching gates 4*a*, 4*b* that guide to the exclusive housings 3*a* to 3*c* the bills, the money types of which have been determined, delivery sections 5*a* to 5*c* for delivering bills from the exclusive housings 3*a* to 3*c*, an output-money identification section 6 for identifying the delivered bills, a switching gate 7 that operates according to a result of identification by the output-money identification section 6, an output money reject housing 8 that houses the bills that have been determined by the output-money identification section 6 not to be output, and an output port 9 from which bills to be output are unloaded.

In a money loading or input operation of the bill-processing machine, bills are input through the input port 1, and the input-money identification section 2 determines the money types of the bills. Then, the bills, the money type of which can not be determined, are returned, while the bills, the money type of which has been determined, are loaded. The switching gate 4*a* or 4*b* operates depending on the result of the money type determination made by the input-money identification section 2, and the bills, the money type of which has been determined, are guided to the exclusive housing 3*a*, 3*b* or 3*c* corresponding to the money type, where they are accumulated and housed.

In a money output operation, the delivery sections 5*a* to 5*c* deliver a required number of the bills of the corresponding money types that are accumulated and housed in the exclusive housings 3*a* to 3*c*, starting from the bill located at the top, and the output-money identification section 6 identifies the bills, which are then transferred to the output port 9 and unloaded therefrom. In case the money type of the bill can not be determined, for example, overlapping or counterfeit bill, the transfer path for the bill is switched by the switching gate 7 and housed in the output money reject housing 8.

The bill-processing machine is configured so that the three types of bills are housed in the separately provided exclusive housings, respectively, but may be adapted to be housed in a common housing, two types of bills, that is, 5,000 and 10,000 yen, which are less frequently used, thereby reducing the number of housings and the size of the machine. In this case, if, in a money output operation, a bill delivered when 5,000 yen is required as change is determined to be a 10,000 yen bill, this 10,000 yen bill is housed in the output money reject housing, as it is the money type that is not reused as change.

The conventional bill-processing machine, however, can determine the number of bills (existing amount) for each money type, but if any overlapping bills are found during output, these bills are housed in the output money reject housing. Thus, the actual number of the bills in the housing is unequal to the number of the bills available as change, so that this change unloading machine can not identify the number of the bills reduced due to output, thereby preventing the existing amount from being determined accurately.

In addition, if a plurality of money types (for example, 1,000- and 5,000-yen bills) are used as change, at least two housings must be provided, thereby hindering the cost and size reduction of the bill-processing machine.

The present invention has been made in view of these points, and its object is to provide a method for controlling a bill-processing machine, which enables the existing amount of bills housed in the machine to be determined as required.

SUMMARY OF THE INVENTION

To achieve this object, the present invention provides a method for controlling a bill-processing machine comprising an input-money identification section for identifying a loaded bill, a bill housing that receives the identified bills through a receiving port to accumulate and house the bills and that unloads the accumulated and housed bills through an unloading port, an output-money identification section for identifying the unloaded bills, a circulating path through which the unloaded bills are guided to the receiving port in the bill housing, and a switching gate that switches a transfer path for the unloaded bills to an output port or the circulating path. The method comprises the steps of using the input-money identification section to identify the loaded bills based on detection of loading of the bills, increasing the existing amounts in existing-amount memories for the corresponding money types depending on the result of the input bill identification, sequentially unloading bills from the bill housing based on a money output instruction, and using the output-money identification section to identify the unloaded bill. If the identified bill is to be output, the switching gate is switched to the output port to reduce the existing amount in the existing-amount memory for the corresponding money type of the bill guided to the output port, and if the identified bill is not to be output, the switching gate is switched to the circulating path, this step being repeated until the indicated amount to be output has been reached.

According to this method for controlling the bill-processing machine, when the bills are unloaded from the bill housing, the number of bills guided to the output port is subtracted from the existing-amount memories for the corresponding money types, whereas the number of bills circulated to the bill housing because they have been determined to be false bills (including overlapping bills) or to be of an irrelevant money type is not subtracted from the existing-amount memories. This configuration enables the number of bills housed in the bill-processing machine to be constantly determined for each money type. In addition, this configuration uses only one circulatory bill housing to enable the cost and size of the bill-processing machine to be reduced.

In addition, the method includes the steps of detecting a dummy bill housed in the bill housing while circulating the bills in the bill housing based on a close inspection instruction, clearing a close inspection counter, sequentially delivering the bills from the bill housing, allowing the output-money identification section to perform output-money identification, sequentially increasing the number of the bills in the close inspection counter according to the determined money types, and stopping the operation of delivering the bills from the bill housing based on the detection of the dummy bill again.

Thus, even if reserve change is supplied in bundles or is manually supplied to the bill-processing machine and the contents of the existing-amount memories are unequal to the amount of money actually existing in the machine, the amount of the housed bills can be constantly determined.

BRIEF DESCRIPTION OF THE DRAWINGS

FIGS. 12(A)–12(C) describe a method for detecting degradation of the dummy bill in the close inspection, wherein FIG. 12(A) is a top view for showing an outline of the dummy bill; FIG. 12(B) shows a variation in the detection level of an output-money identification sensor observed when the dummy bill is normal; and FIG. 12(C) shows a variation in the detection level of the output-money identification sensor observed when the dummy bill is degraded.

DETAILED DESCRIPTION OF PREFERRED EMBODIMENTS

The embodiments of the present invention will be described below in detail with reference to the drawings.

Figure 1:
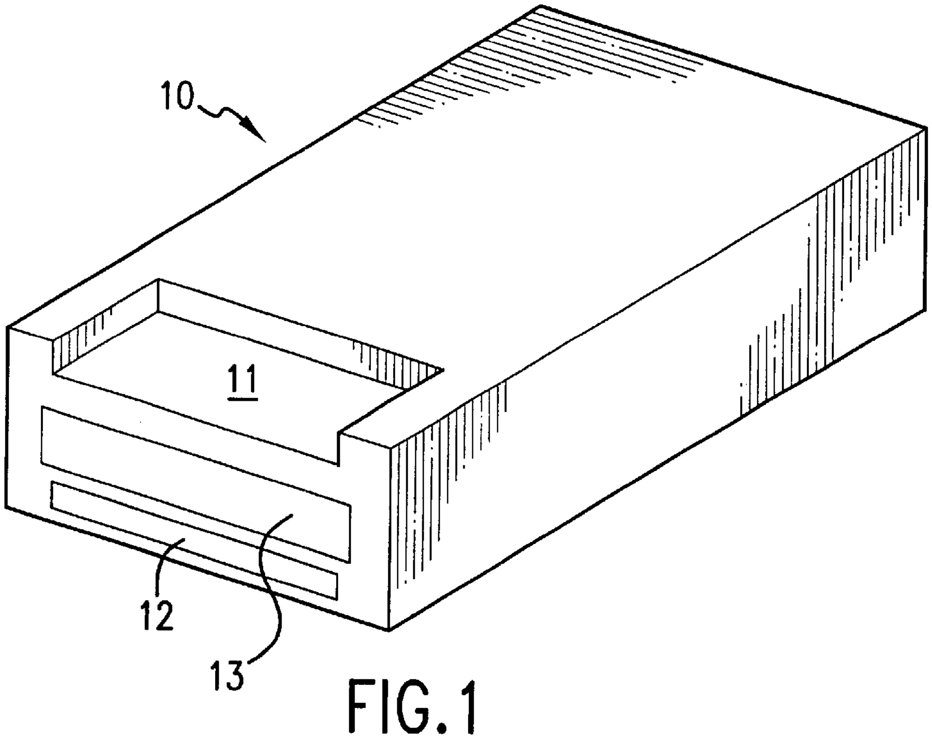
FIG. 1 is a perspective view for showing an appearance of a bill-processing machine.

FIG. 1 shows an appearance of a bill-processing machine.

Figure 2:
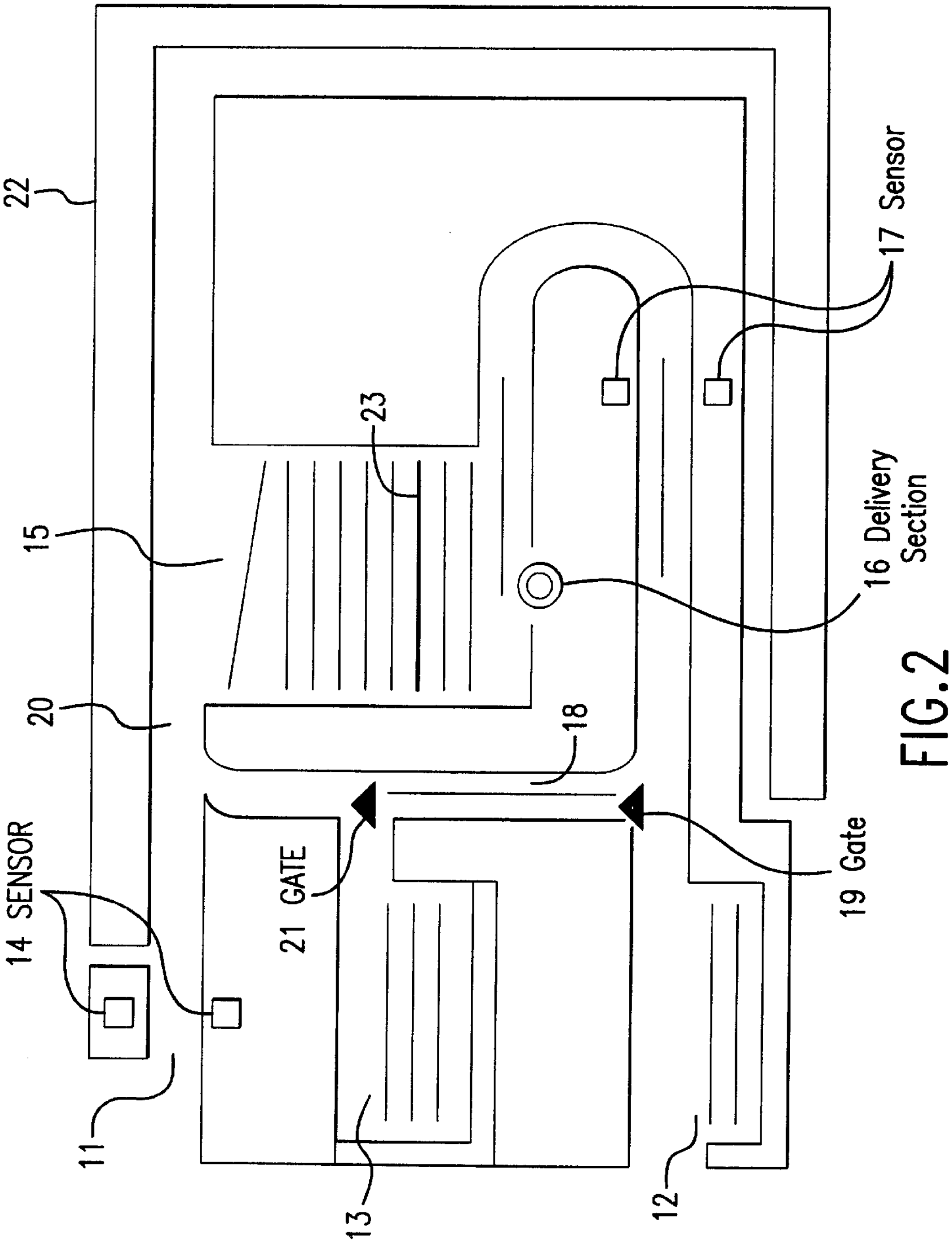
FIG. 2 is an explanatory side view for showing an internal configuration of the bill-processing machine.

FIG. 2 is an explanatory side view for showing an internal configuration of the bill-processing machine. In these figures, the bill-processing machine 10 includes an external input port 11 through which bills are input, an output port 12 through which bills are unloaded from the bill-processing machine 10 as change, and a bill-recovery housing 13 in which large denomination bills that can not be used as change are housed.

An input-money identification sensor 14 is provided near the bill input port 11, and a bill-reception port in a bill housing 15 is located ahead of the sensor 14. A delivery section 16 is provided at the bottom of the bill housing 15 to sequentially and separately deliver the accumulated and housed bills starting from the bill at the bottom. An output-money identification sensor 17 is provided at the downstream side of an unloading port in the bill housing 15 from which the bills are delivered. The unloading port in the bill housing 15 is connected to the output port 12 and a circulating passage 18 arranged in a vertical direction. A switching gate 19 is provided at a lower end of the circulating passage 18 to switch a transfer path for the bills, and an upper end of the circulating passage is connected to the bill-reception port 20 for the bill housing 15. In addition, the circulating passage 18 has in its middle a switching gate 21 to switch the transfer path of the circulating passage 18 toward the bill-recovery housing 13. The output port 12, the bill-recovery housing 13, the bill housing 15 and the circulating passage 18 are integrated together to constitute an internal unit housed in an enclosure 22 so as to be drawn out. The bill housing 15 has a dummy bill 23 to be used to closely inspect the existing amount of money.

The input port 11 has an opening in such a height that a plurality of bills can be simultaneously received, and a plurality of bills received through this opening passes through the input-money identification sensor 14 in a bundle and is then transferred to the bill housing 15. In order to enable the bills to be received in a bundle, the input-money identification sensor 14 has a function for detecting the thickness of the input bills. In addition, the dummy bill 23 used to closely inspect the existing amount is accumulated and housed in the bill housing 15 together with the normal bills.

A flow of bills through the bill-processing machine 10 during a normal transaction will be described below. First, when one or more bills are input through the input port 11, a bill detection sensor (not shown) detects the loading of the bill to drive an input money transfer motor. The bill is guided to the input-money identification sensor 14, which determines the money type of the bill and whether it is authentic. The bill that can not be determined by the input-money identification sensor 14 to be authentic is returned to the input port 11. The bill that has been determined to be authentic or the bills overlapping one another are guided to the bill housing 15, while passing through the bill-reception port 20 provided at the top. The bill is then accumulated and housed in the bill housing 15.

The delivery section 16 sequentially delivers the housed bills from the bottom of the bill housing 15 upon a change unloading instruction from a higher control device (not shown) or upon an unloading operation performed by an operation and display section (not shown), and the output-money identification sensor 17 determines the money type of the delivered bill. If the bill is determined to be output, the switching gate 19 is switched to the output port side to guide this bill toward the output port 12. In addition, if the bill is not determined to be output, the switching gate 19 is switched to the circulating passage side so that this bill is again accumulated and housed in the bill housing 15 via the circulating passage 18. If the delivered bill is a large-denomination bill that can not be used as change, the switching gate 21 is switched to the bill-recovery housing 13 side to house this bill therein.

In addition, if reserve change is manually supplied by directly setting it in the bill housing 15 of the bill-processing machine 10, the internal unit is drawn out from the enclosure 22 and bills are directly inserted as reserve change into the bill housing 15, the top of which is opened. Once setting of the reserve change has been completed, the internal unit is re-housed in the enclosure 22.

A configuration of a control section of the bill-processing machine 10 is described below.

Figure 3:
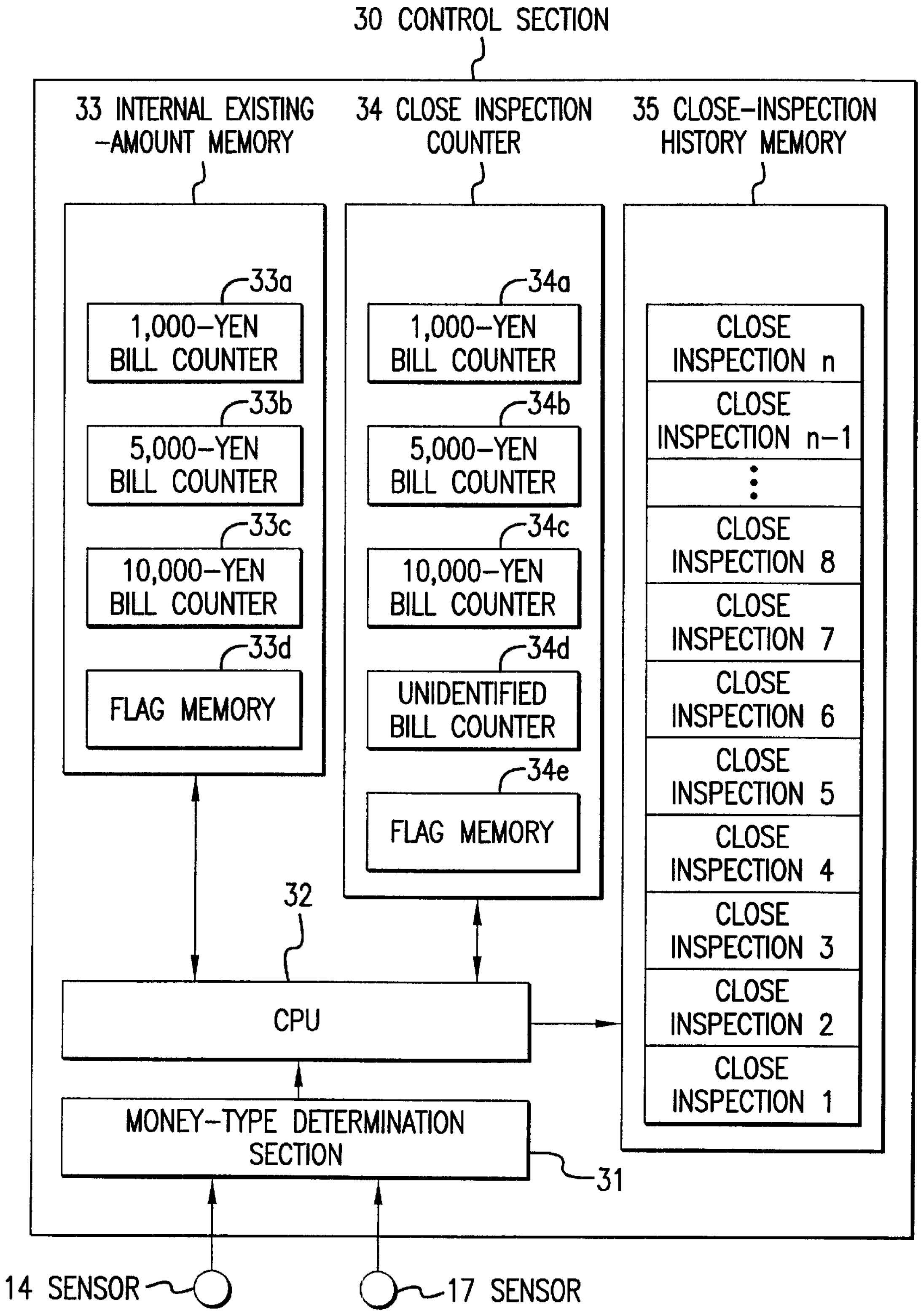
FIG. 3 is a block diagram for showing an example of a configuration of a control section of the bill-processing machine.

FIG. 3 is a block diagram for showing an example of the configuration of the control section of the bill-processing machine. The control section 30 of the bill-processing machine 10 comprises a money-type determination section 31 connected to the input-money identification sensor 14 and output-money identification sensor 17, a processor (CPU) 32, an internal existing-amount memory 33, a close inspection counter 34, and a close-inspection history memory 35. The internal existing-amount memory 33 includes bill counters, number of which is the same as the money types that are dealt with by the machine, including a 1,000-yen bill counter 33*a*, a 5,000-yen bill counter 33*b* and a 10,000-yen bill counter 33*c*, as well as a flag memory 33*d*. In addition, in order to count the number of bills for each money type during close inspection, the close inspection counter 34 has a 1,000-yen bill counter 34*a*, a 5,000-yen bill counter 34*b*, and a 10,000-yen bill counter 34*c*, as well as an unidentified bill counter 34*d* and a flag memory 34*e*.

The money-type determination section 31 has a function for not only determining the three money types of the distributed bills but also identifying the overlapping bills, the dummy bill 23 and degradation of these bills. The money-type determination section 31 determines the money type of a bill detected by the input-money identification sensor 14 upon input and also determines whether the bill is overlapping another bill before sending the result of determination to the processor 32. Upon receiving the result of the determination, the processor 32 transmits it to the bill counter for the corresponding money type in the internal existing-amount memory 33 to increase the count by one. The output-money identification sensor 17 of the money-type determination section 31 also detects a bill delivered from the bill housing 15, and the money-type determination section 31 determines the money type and sends the result to the processor 32. The processor 32 transmits the result to the internal existing-amount memory 33, decreasing by one the count in the bill counter for the corresponding money type. Furthermore, when the money-type determination section 31 detects the overlapping bills, the processor 32 transmits this detection result to the internal existing-amount memory 33, where it is stored in the flag memory 33*d*. The flag memory 33*d* also stores a degradation-indication request flag that is used to indicate when the dummy bill 23 for close inspection is degraded.

The close inspection counter 34 and the close-inspection history memory 35 are used to closely inspect the amount of the bills housed in the bill housing 15. The close inspection counter 34 counts the existing amount for each money type, and the result of counting by the close inspection counter 34 is additionally stored in the close-inspection history memory 35. In addition, the unidentified bill counter 34*d* of the close inspection counter 34 counts the number of bills, the money type of which can not be determined by the output-money identification sensor 17 during the close inspection. The flag memory 34*e* stores a dummy-bill presence flag indicating whether the machine contains the dummy bill 23, and an automatic-close-inspection flag indicating that the output-money identification sensor 17 has detected that the dummy bill 23 is degraded.

In this manner, during a normal operation, number of the bills input or output through the input port 11 or output port 12 is stored in the internal existing-amount memory 33 for each money type, thereby enabling the amount of the bills housed in the bill-processing machine to be managed. If, however, a plurality of overlapping bills is input through the input port 11 and if reserve change is directly supplied to the bill housing 15 manually, counting using the internal existing-amount memory 33 is not performed, so at this point, the number of the bills in the internal existing-amount memory 33 is not equal to the number of the bills actually housed.

In such a case, a close inspection is conducted to determine the exact number of the bills housed in the bill housing 15. The close inspection operation is performed by sequentially delivering the bills from the bill housing 15, determining the money types of the delivered bills using the output-money identification sensor 17, and repeating these steps until all the bills have been inspected. The details will be described later.

Although not shown, the control section 30 can drive a loaded-bill transfer motor, activate and stop the delivery section 16, and control switching of the switching gates 19, 21, in response to the bill detection sensor.

An input operation of the bill-processing machine 10 is explained below.

Figure 4:
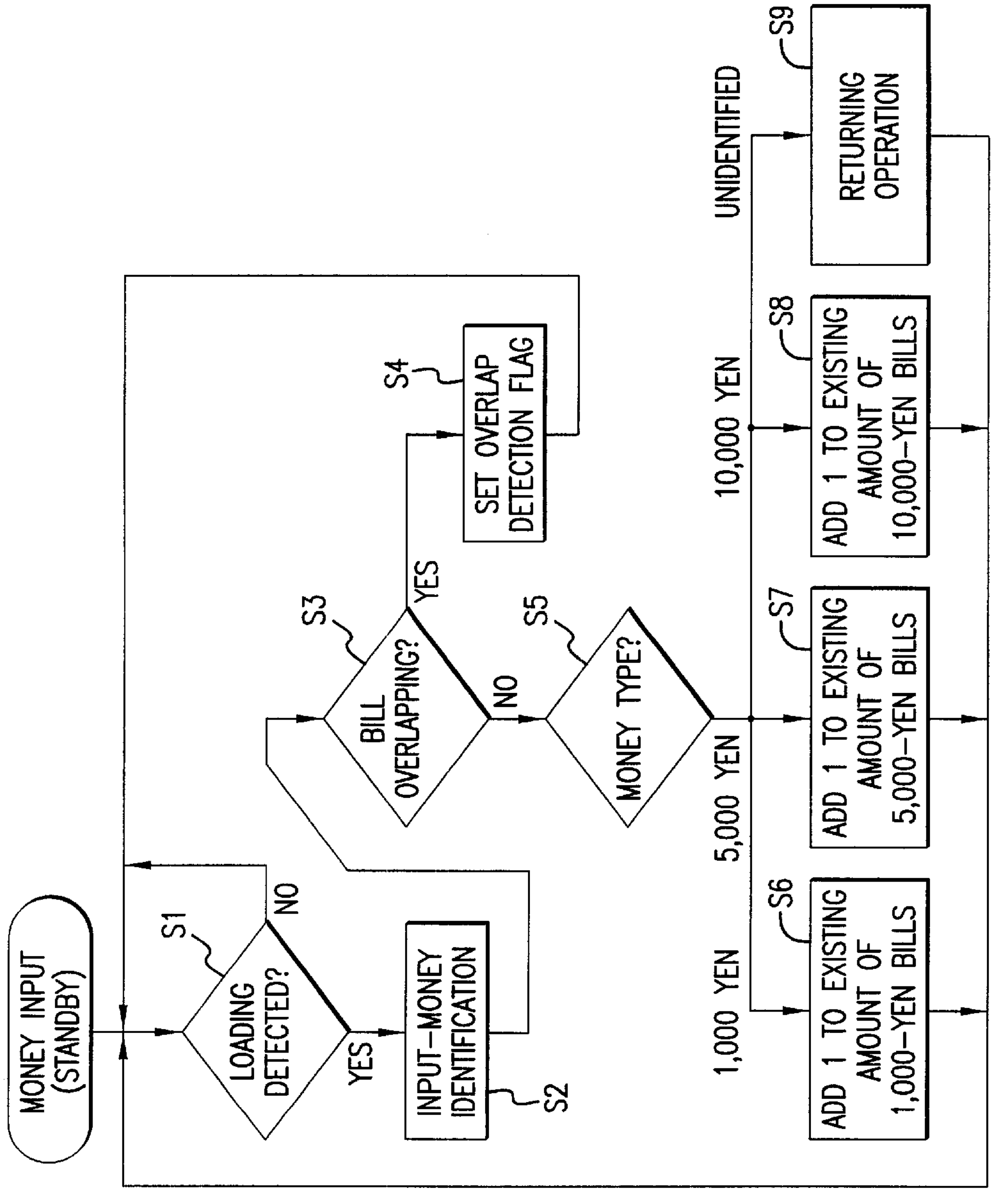
FIG. 4 is a flow chart for showing a flow of processing carried out by the bill-processing machine during a money input operation.

FIG. 4 is a flow chart for showing the flow of the input operation of the bill-processing machine. First, the process determines whether the bill detection sensor provided at the input port 11 has detected the loading of bills (step S1). If not, the bill detection sensor waits for the detection. If it detects the loading, the control section 30 drives the loaded-bill transfer motor to guide the bill to the input-money identification sensor 14, which then, together with the money-type determination section 31 of the control section 30, determines the money type of the input bill, the thickness, and whether it is authentic (step S2). Next, the process determines whether the loaded bills are mutually overlapping, based on the result of the input bill identification and the determination of the thickness (step S3). If the bills are determined to be mutually overlapping, an overlap detection flag is set in the flag memory 33*d* of the internal existing-amount memory 33 (step S4), and the bundled bills are directly accepted and transferred to the bill housing 15. The process returns to a standby state. Otherwise, the money type of the bill is determined (step S5).

If the result of the identification shows that the input bill is 1,000 yen, the control section 30 adds one to the count in the 1,000-yen bill counter 33*a* of the internal existing-amount memory 33 (step S6). If the result of the identification shows that the input bill is 5,000 yen, the control section 30 adds one to the count in the 5,000-yen bill counter 33*b* of the internal existing-amount memory 33 (step S7). If the result of the identification shows that the input bill is 10,000 yen, the control section 30 adds one to the count in the 10,000-yen bill counter 33*c* of the internal existing-amount memory 33 (step S8). If the loaded bill is determined to be none of the three distributed money types, the loaded-bill transfer motor is reversely driven to return the bill to the input port 11 as an unidentified bill (step S9). Subsequently, the process returns to step S1 to enter the standby state.

Figure 5:
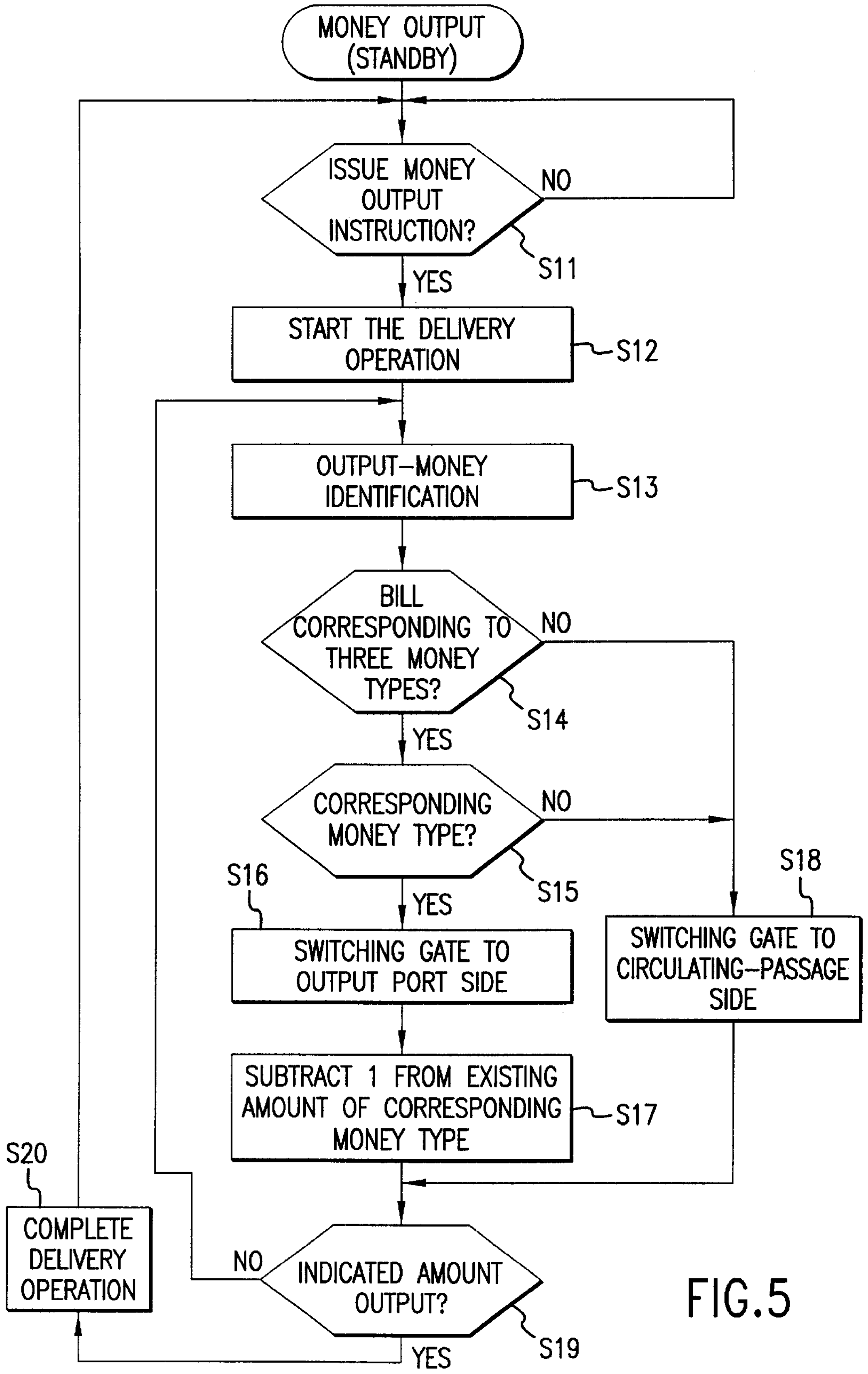
FIG. 5 is a flow chart for showing a flow of a money output operation performed by the bill-processing machine.

FIG. 5 is a flow chart for showing a flow of an output operation of the bill-processing machine. First, the process determines whether the external higher apparatus has issued a money output instruction (step S11). If not, the process awaits until such an instruction is provided. If the higher apparatus issues the instruction, the delivery section 16 starts its operation to deliver one bill from the bill housing 15 (step S12). Next, the output-money identification sensor 17 determines the money type of the delivered bill (step S13). The process then determines whether the result of the money type determination indicates that the delivered bill is a 1,000-, 5,000-, or 10,000-yen bill (step S14). Once the determination has been made, the process determines whether the bill is to be unloaded as change (step S15). If so, the switching gate 19 is switched to the output port 12 side (step S16), while the count in the bill counter for the corresponding money type is decreased by one in the internal existing-amount memory 33 (step S17).

If, at step S14, the bill is determined to be the dummy bill 23 or determined to be none of the three types, or if at step S15, the bill is not determined to be unloaded, the switching gate is switched to the circulating-passage 18 side to accumulate and house this bill in the bill housing 15 again (step S18).

Next, the process determines whether the indicated amount has been output (step S19), and if the amount of the output bill is less than the indicated amount, the process returns to step S13 to identify the bill delivered next. If the indicated amount has been output, the delivery operation is stopped to return to the standby state (step S20).

Next, a process carried out by the control section 30 in performing the close inspection operation will be described.

Figure 6:
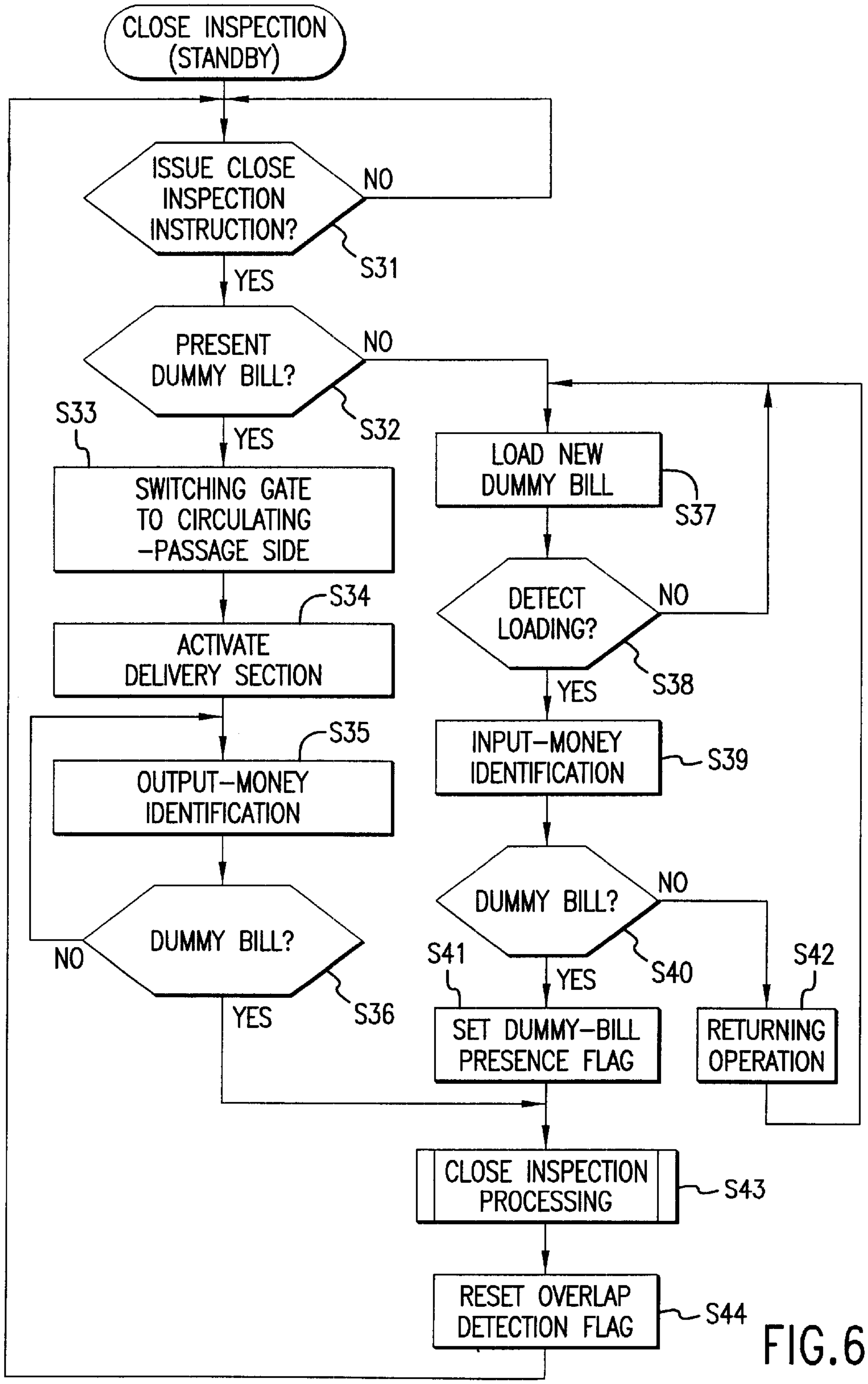
FIG. 6 is a flow chart for showing a flow of a close inspection operation performed by the bill-processing machine.

FIG. 6 is a flow chart for showing a flow of the close inspection operation performed by the bill-processing machine. First, the process determines whether the operation and display section (not shown) has issued an instruction for the close inspection (step S31), and if not, the process waits for issuance of such instruction. If the close inspection instruction is issued, the process determines whether the machine contains the dummy bill 23 specially created for the close inspection (step S32). This is determined by checking whether the dummy bill presence flag has been set in the flag memory 34*e* of the close inspection counter 34. If the machine contains the dummy bill 23, the switching gate 19 is switched to the circulating-passage 18 side (step S33) and the delivery section 16 is activated (step S34). A delivered bill is then identified (step S35) to determine whether it is the dummy bill 23 (step S36). If not, the process returns to step S35 to repeat the output-money identification until the dummy bill 23 is delivered. When the dummy bill 23 is identified, a close inspection start position of the bills in the bill housing 15 is determined.

If, at step S32, the machine contains no dummy bill 23, the operation and display section (not shown) displays an instruction to load the dummy bill 23 (step S37). Next, the process determines whether loading of the bill has been detected (step S38), and if not, the process waits for the detection. When loading is detected, the input-money identification sensor 14 identifies the input money (step S39). Next, the process determines whether this bill is the dummy bill 23 (step S40). If so, the dummy-bill presence flag is set in the flag memory 34*e* of the close inspection counter 34 (step S41). Otherwise, the process performs a returning operation (step S42) to return to step S37.

If, at step S36, the bill delivered from the bill housing 15 is determined to be the dummy, or if at step S41, a dummy bill 23 is loaded in the machine, the close inspection (step S43) is started. The overlap detection flag in the flag memory 33*d* of the internal existing-amount memory 33 is then reset (step S44).

Figure 7A:
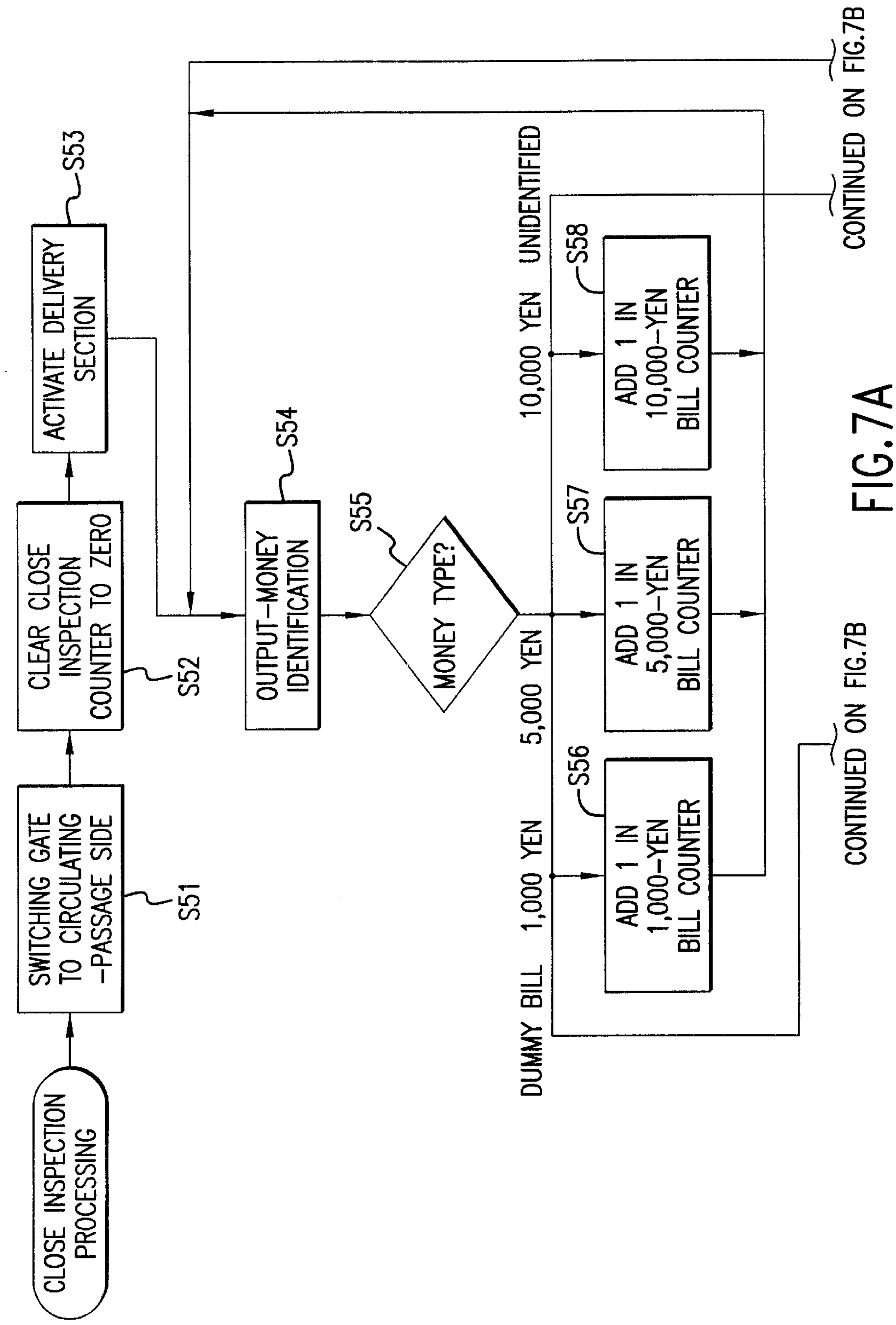
FIG. 7 is a flow chart for showing a flow of the close inspection operation performed by the bill-processing machine.
Figure 7B:
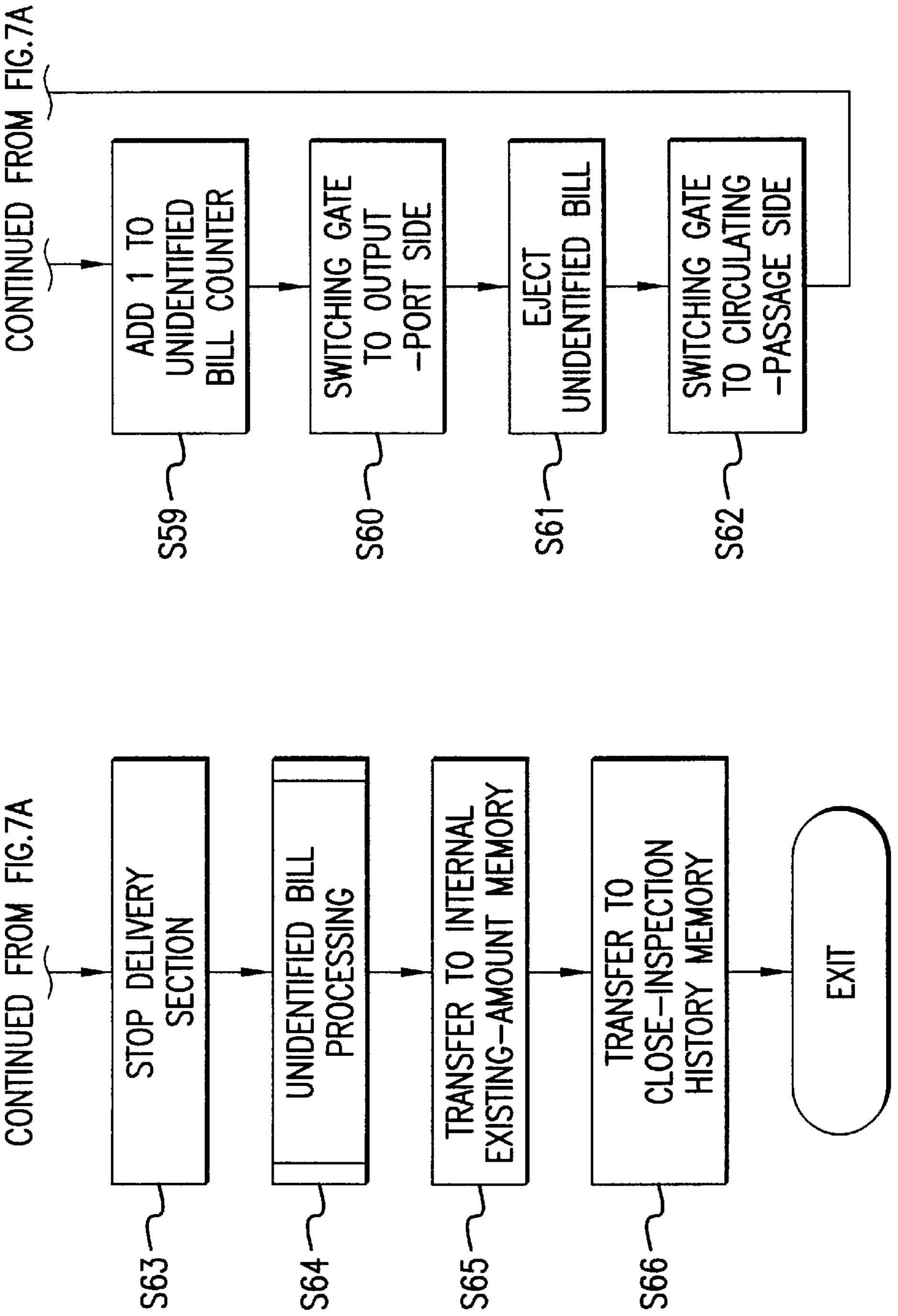

FIG. 7 is a flow chart for showing a flow of the close inspection carried out by the bill-processing machine. First, the control section 30 switches the switching gates 19, 21 to the circulating-passage 18 side (step S51). The control section 30 then clears the bill counter for each money type and the unidentified bill counter 34*d* in the close inspection counter 34 to zero (step S52).

Next, the control section 30 activates the delivery section 16 to begin delivering of the bills housed in the bill housing 15 (step S53). The output-money identification sensor 17 detects the delivered bill, and the money-type determination section 31 identifies the output bill (step S54). Next, the process branches based on the determined money type of the bill (step S55). That is, if the bill is 1,000 yen, one is added to the count in the 1,000-yen bill counter 34*a* of the close inspection counter 34 (step S56). If the bill is 5,000 yen, one is added to the count in the 5,000-yen bill counter 34*b* of the close inspection counter 34 (step S57). If the bill is 10,000 yen, one is added to the count in the 10,000-yen bill counter 34*c* of the close inspection counter 34 (step S58). After the addition processing by the close inspection counter 34, the process returns to step S54 to identify the next delivered bill.

If at step S55, the output money is determined to be none of the three types of the bills nor the dummy bill and can not be identified, i.e. if it is, for example, a counterfeit bill, an extremely dirty or damaged bill, a dummy bill that has been too degraded to be identified, or a gift certificate that was mixed with the other bills upon a bundled input, then one is added to the count in the unidentified bill counter 34*d* of the close inspection counter 34 (step S59), and the switching gate 19 is switched to the output port 12 side (step S60). In addition, the unidentified bill is ejected to the output port 12 (step S61). Subsequently, the switching gate 19 is returned to the circulating-passage 18 side (step S62), and the process returns to step S54 to identify the next delivered bill.

If, at step S55, the money is determined to be the dummy bill 23, the delivery section 16 is stopped to halt the bill delivery operation (step S63). At this point, the close inspection counter 34 has already calculated for each money type the number of bills housed in the bill housing 15 except the unidentified bill ejected to the exterior of the machine. Next, the control section 30 processes the ejected unidentified bill (step S64), and transfers to the internal existing amount money 33 the result of the calculation executed by the close inspection counter 34 (step S65). Likewise, the result of the calculation executed by the close inspection counter 34 is transferred to the close-inspection history memory 35 (step S66). In this case, the result is not transferred to the close-inspection history memory 35 by overwriting but by sequentially increasing the value of a pointer (not shown) and adding it to the area next to the preceding stored content.

Figure 8:
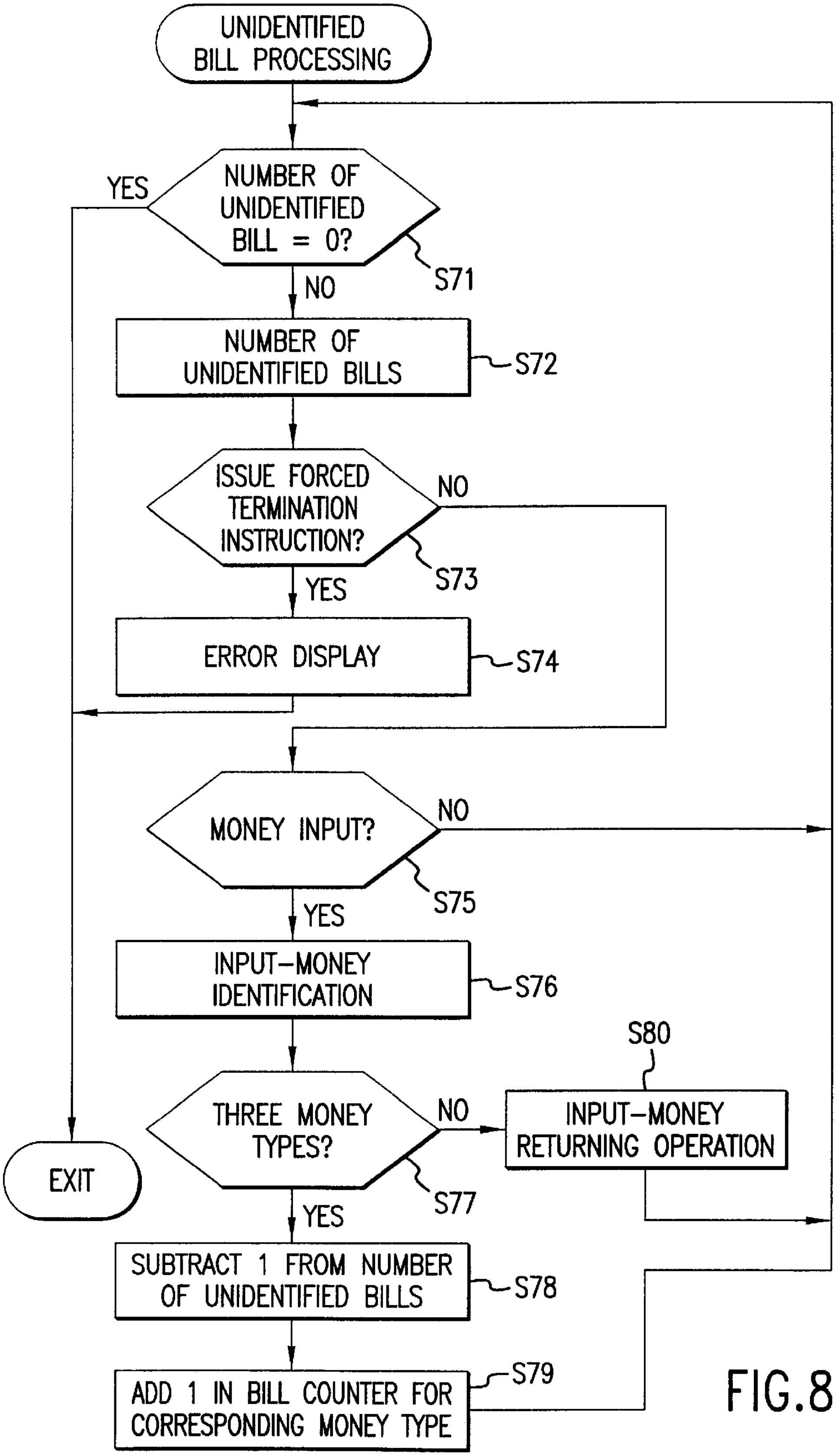
FIG. 8 is a flow chart for showing a flow of an unidentified bill processing in the close inspection operation.

FIG. 8 is a flow chart for showing a flow of the unidentified bill processing in the close inspection processing. During the unidentified bill processing, the process first determines whether the unidentified bill counter 34*d* of the close inspection counter 34 indicates zero as the number of the unidentified bills (step S71), and if so, this unidentified bill processing is completed. If there is any unidentified bill, the operation and display section (not shown) displays the number of the unidentified bills (step S72). Next, the process determines whether a forced end instruction has been issued (step S73), and if so, an error is displayed to terminate the unidentified bill processing (step S74). That is, if the bill ejected as the unidentified one is determined to be something that is unrelated to the existing amount processing, for example, a gift certificate, then there is no need for this unidentified bill processing to continue, and thus it can be forcibly terminated.

If the forced end instruction has not been issued, the process determines whether there is any input money (step S75). Otherwise, the process returns to step S71 to repeat processing from steps S71 to S73 until input money is detected. In this case, if a bill of the same money type as the ejected unidentified bill is loaded in the input port 11, the input-money identification sensor 14 and the money-type determination section 31 identify the money type (step S76). Next, the result of the input-money identification indicates which of the three money types corresponds to the input money (step S77). If the input money corresponds to one of the three types, then, the count in the unidentified bill counter 34*d* is decreased by one (step S78), and the count in the bill counter for the corresponding money type is increased by one, followed by a return to step S71 (step S79). If at step S77, the input money corresponds to none of the three types, an input-money returning operation is performed (step S80), and the process returns to step S71.

Even if a plurality of bundled bills is loaded through the input port 11 or reserve change is supplied to the bill housing 15 during the operation of the bill-processing machine 10, which makes the content of the internal existing-amount memory 33 different from the number of the bills actually housed, then the above close inspection is performed to correct the internal existing-amount memory 33 so that it reflects the number of the housed bills counted during this close inspection, thereby enabling the existing amount to be managed more accurately.

Next, if a higher apparatus issues an existing amount readout command, the bill-processing machine 10 returns to the higher apparatus the data of the number of the bills housed in the bill housing 15. The operation performed by the control section 30 at this point is described below.

Figure 9A:
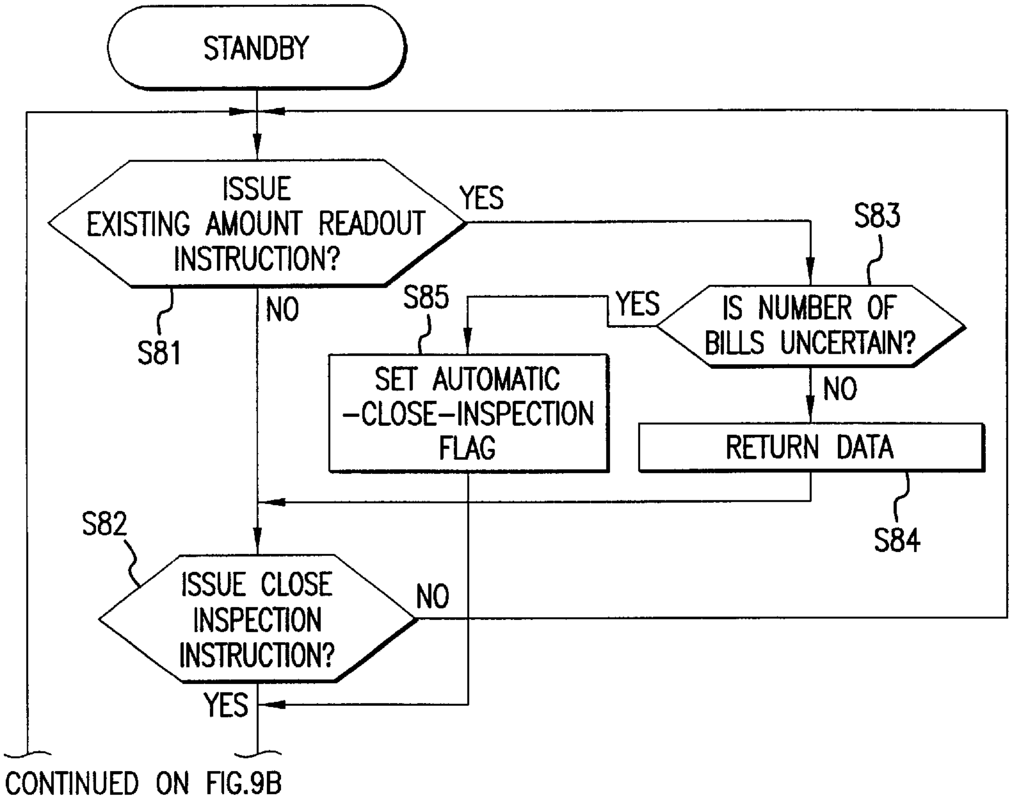
FIG. 9 is a flow chart for showing a flow of an operation performed by the bill-processing machine upon receiving an existing-amount readout instruction.
Figure 9B:
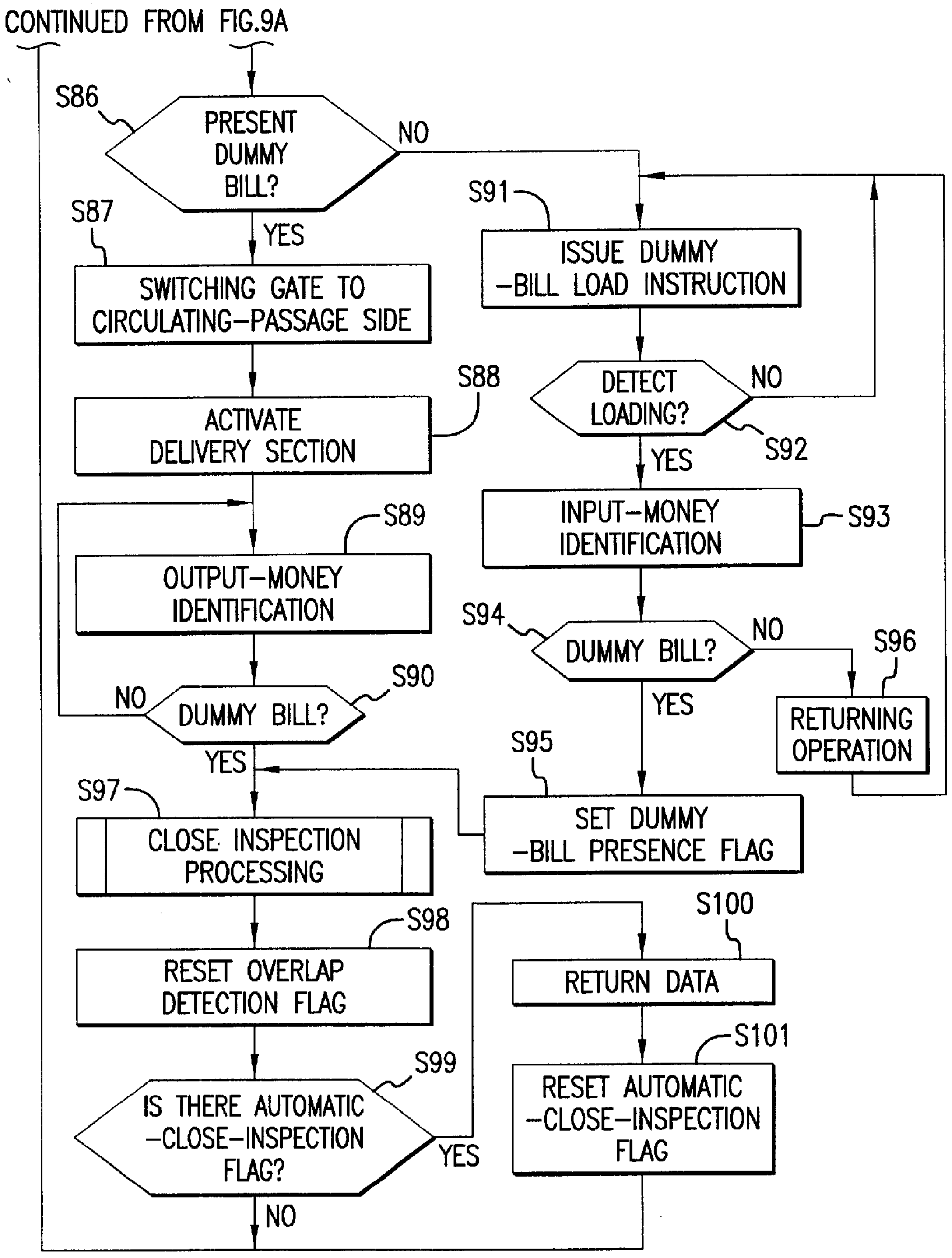

FIG. 9 is a flow chart for showing a flow of an operation performed by the bill-processing machine upon receiving the existing-amount readout instruction. First, the process determines whether the existing-amount readout instruction has been issued (step S81), and if not, the process determines whether the close inspection instruction has been issued (step S82). If not, the process waits for an instruction. If at step S81, the higher apparatus issues the existing-amount readout instruction, the process determines whether the number of the bills housed in the machine is uncertain (step S83). This is determined by checking whether the overlap detection flag has been set in the flag memory 33*d* of the internal existing-amount memory 33. If not, no overlapping bill has been input, so the value of each bill counter of the internal existing-amount memory 33 is equal to the number of the bills actually housed. Consequently, the relevant data is returned to the higher apparatus (step S84) and the process passes to step S82. If the overlap detection flag has been set, the input overlapping bills have made the value of the internal existing-amount memory 33 different from the number of the bills actually housed, thereby requiring the close inspection. At this point, the processor 32 sets the automatic-close-inspection flag in the flag memory 34*e* of the close inspection counter 34.

Next, if at step S82, the close inspection instruction is issued or, at step S85, the automatic-close-inspection flag is set, the process determines whether the machine contains the dummy bill 23 for the close inspection (step S86). The flag memory 34*e* of the close inspection counter 34 is referenced for the dummy-bill presence flag, and if this flag is set therein, it indicates that the machine contains the dummy bill 23, and then, the switching gate 19 is switched to the circulating-passage 18 side (step S87) to activate the delivery section 16 (step S88). The delivered bill is then subjected to the output-money identification (step S89) to determine whether this bill is the dummy bill 23 (step S90). If not, the process returns to step S89, and the output-money identification is repeated until the dummy bill 23 is delivered.

If step S86 determines that the machine contains no dummy bill 23, the operation and display section (not shown) displays an instruction for loading the dummy bill (step S91). Next, the process determines whether loading of the bill has been detected (step S92), and if not, the process waits for that detection. When loading is detected, the input-money identification sensor 14 identifies the input money (step S93). Next, the process determines whether this bill is the dummy bill 23 (step S94). If the dummy bill 23 has been loaded, the dummy-bill presence flag is set in the flag memory 34*e* of the close inspection counter 34 (step S95). If this is not the dummy bill 23, the returning operation is performed (step S96), and the process returns to step S91.

If, at step S90, the bill delivered from the bill housing 15 is determined to be the dummy, or at step S95, a new dummy bill 23 is loaded in the machine, the close inspection processing (step S97) is started. When the close inspection processing is finished, the overlap detection flag in the flag memory 33*d* of the internal existing-amount memory 33 is reset (step S98). Next, the process determines whether the flag memory 34*e* of the close inspection counter 34 contains the automatic-close-inspection flag (step S99), and if not, the process returns to the first step to enter the standby state. If the flag memory 34*e* contains the automatic-close-inspection flag, the data in the internal existing-amount memory 33 updated by the close inspection processing is returned to the higher apparatus (step S100), and the automatic-close-inspection flag in the flag memory 34*e* is reset (step S101). The process then returns to the standby state.

The dummy bill 23 for the close inspection is normally contained in the machine and repeatedly used for the circulatory operation, so it may be degraded during the operation. Thus, such degraded dummy bill 23 must be detected and replaced with a new one. The operation performed in order to detect whether the dummy bill 23 is degraded is explained below.

Figure 10A:
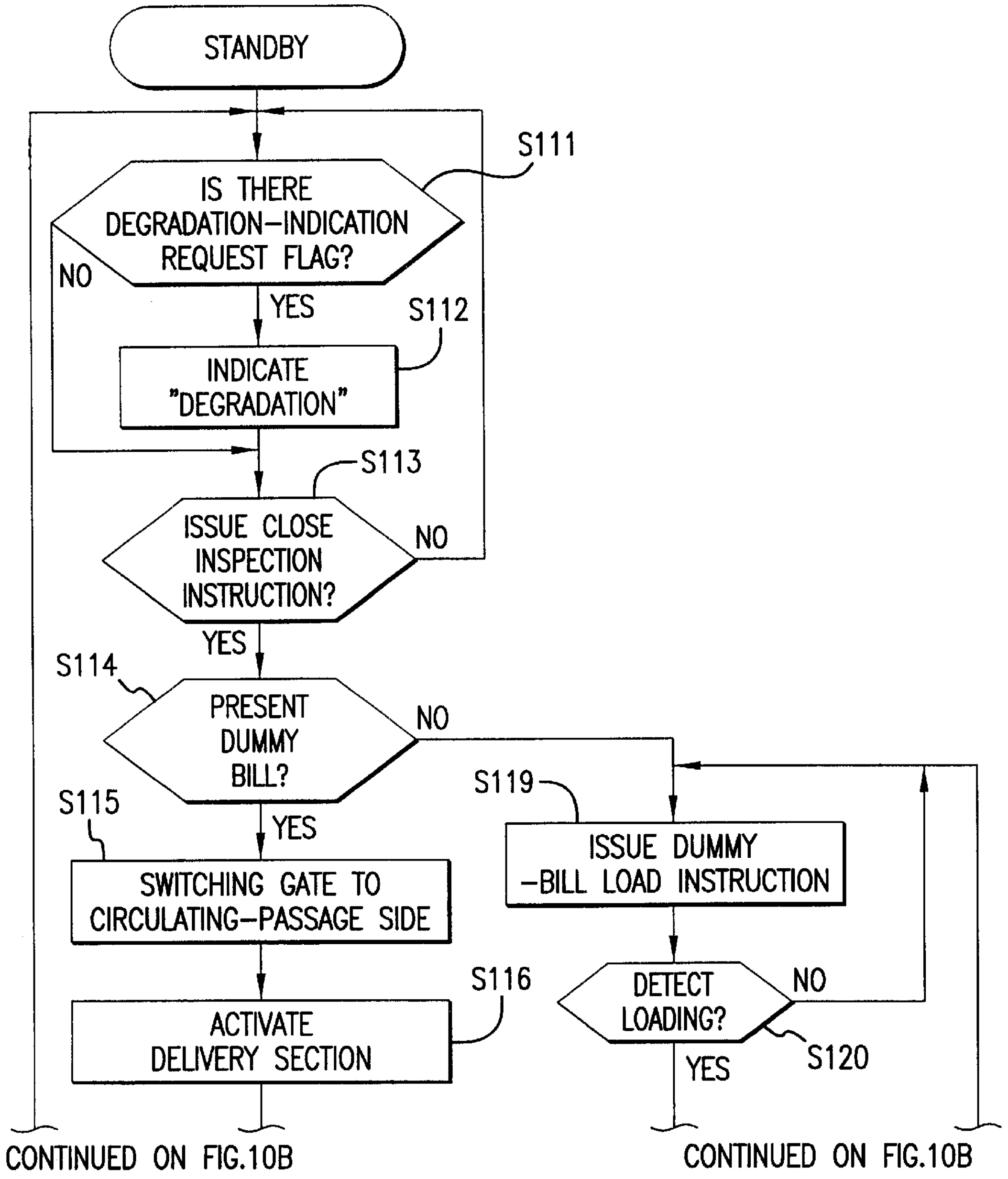
FIG. 10 is a flow chart for showing a flow of an operation performed by the bill-processing machine to detect whether a dummy bill is degraded.
Figure 10B:
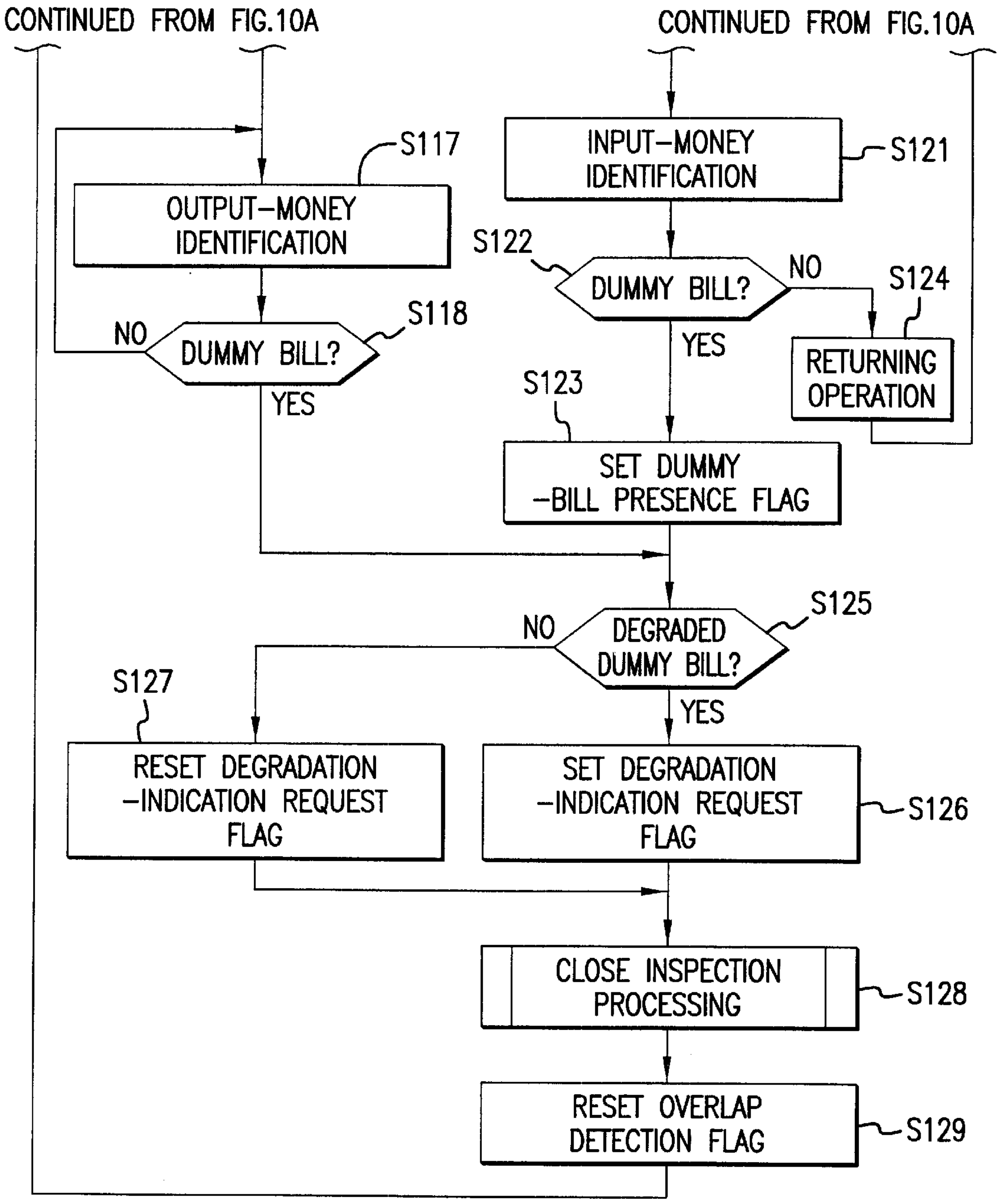

FIG. 10 is a flow chart for showing a flow of an operation performed by the machine to detect whether the dummy bill is degraded. First, the process determines whether a degradation-indication request flag is set in the flag memory 33*d* of the internal existing-amount memory 33 (step S111), and if so, the operation and display section (not shown) indicates that the dummy bill is degraded (step S112). Otherwise, the degradation is not indicated and the process determines whether the close inspection instruction has been issued (step S113), and if not, the process waits for the instruction.

If, at step S113, the close inspection instruction has been issued, it is judged whether the machine contains the dummy bill 23 by checking whether the dummy-bill presence flag is set in the flag memory 34*e* of the close inspection counter 34 (step S114). If the machine contains the dummy bill 23, the switching gate 19 is switched to the circulating-passage 18 side (step S115) to activate the delivery section 16 (step S116). The delivered bill is then subjected to the output-money identification (step S117) to determine whether this bill is the dummy bill 23 (step S118). If not, the process returns to step S117, and the output-money identification is repeated until the dummy bill 23 is delivered.

If step S114 determines that the machine contains no dummy bill 23, the operation and display section (not shown) displays the instruction for loading of a dummy bill (step S119). Next, the process determines whether loading of the bill has been detected (step S120), and if not, the process waits for the detection. When the loading is detected, the input-money identification sensor 14 identifies the input money (step S121). Next, the process determines whether this bill is the dummy bill 23 (step S122). If the dummy bill 23 has been loaded, the dummy-bill presence flag is set in the flag memory 34*e* of the close inspection counter 34 (step S123). If this is not the dummy bill 23, the returning operation is performed (step S124), and the process returns to step S119.

If at step S118, the bill delivered from the bill housing 15 is determined to be the dummy, or at step S123, a new dummy bill 23 is loaded in the machine, the process determines whether the dummy bill 23 is degraded (step S125). If so, the degradation-indication request flag is set in the flag memory 33*d* of the internal existing-amount memory 33 (step S126). Otherwise, the degradation indication request flag in the flag memory 33*d* of the internal existing-amount memory 33 is reset (step S127). The close inspection processing (step S128) is then started. When the close inspection is completed, the overlap-detection flag in the flag memory 33*d* of the internal existing-amount memory 33 is reset (step S129) and the process returns to the standby state.

The ejection of the dummy bill when the operation and display section (not shown) indicates that the dummy bill is degraded is described below.

Figure 11:
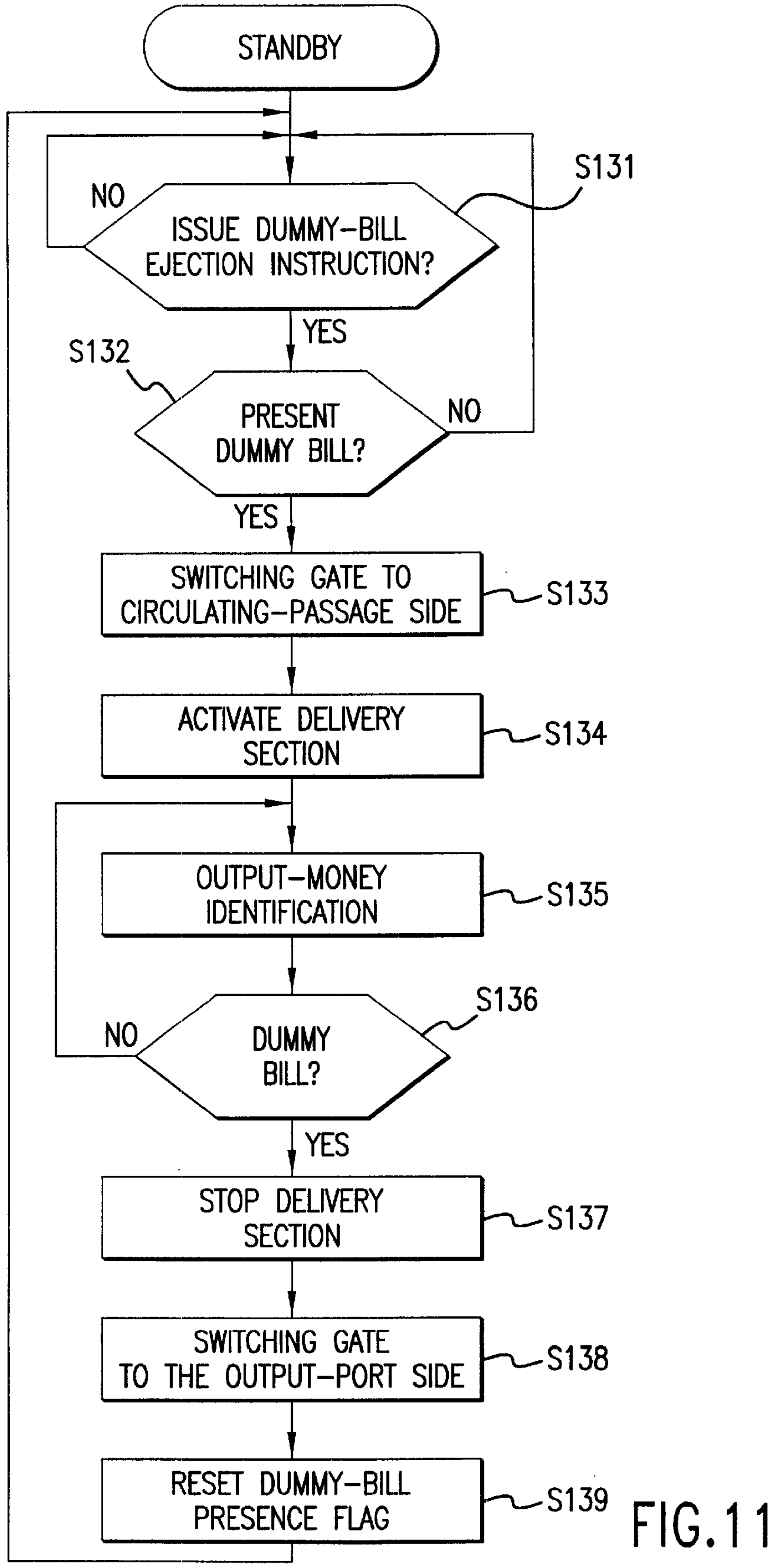
FIG. 11 is a flow chart for showing a flow of an operation performed by the bill-processing machine to eject the dummy bill.

FIG. 11 is a flow chart for showing a flow of an operation of the bill-processing machine to eject a degraded dummy bill. First, the process determines whether an instruction requiring the dummy bill 23 to be ejected (step S131) has been issued. When the dummy bill ejection in a menu displayed on the operation and display section (not shown) is selected and specified, it is determined whether the machine contains the dummy bill 23 for the close inspection by checking whether the dummy-bill presence flag is set in the flag memory 34*e* of the close inspection counter 34 (step S132). If the machine contains no dummy bill, this is indicated and the process returns to the standby state. Otherwise, the switching gate 19 is switched to the circulating-passage 18 side (step S133) in order to activate the delivery section 16 (step S134). The delivered bill is then subjected to the output-money identification (step S135) to determine whether this bill is the dummy bill 23 (step S136). If not, the process returns to step S135, and the output-money identification is repeated until the dummy bill 23 is delivered.

In this manner, when the dummy bill is found among the bills housed in the bill housing 15, the delivery section 16 is stopped (step S137) and the switching gate 19 is switched to the output-port 12 side to eject the dummy bill to the output port 12 (step S138). The dummy-bill presence flag in the flag memory 34*e* of the close inspection counter 34 is reset (step S139), and the process returns to the standby state.

Detection of the degraded state of the dummy bill 23 will now be explained.

Figure 12B:
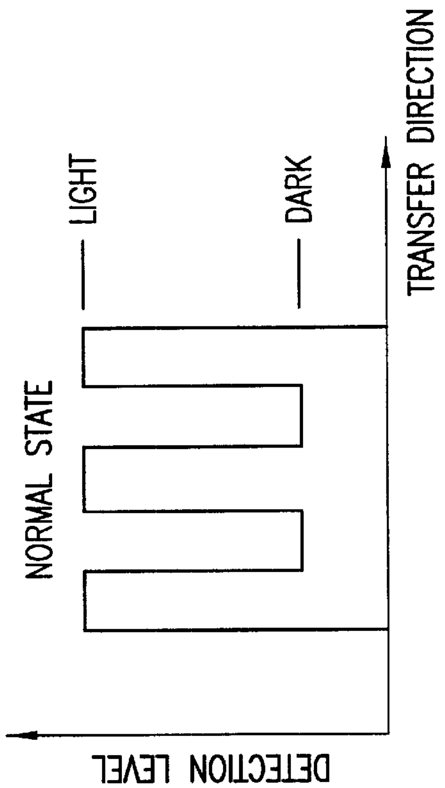
Figure 12C:
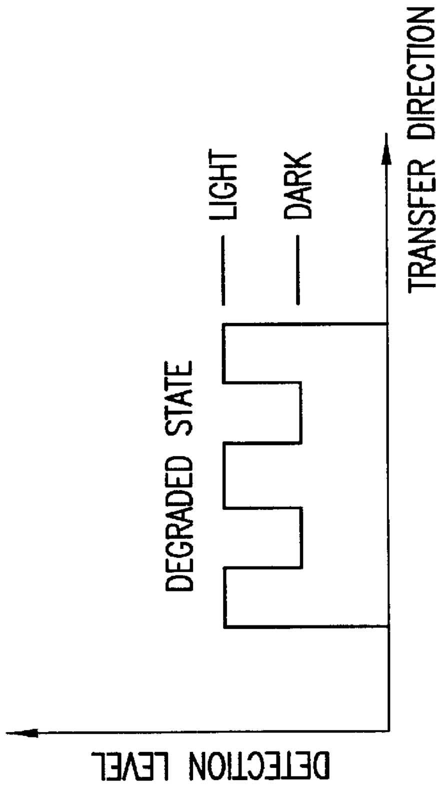
Figure 12A:
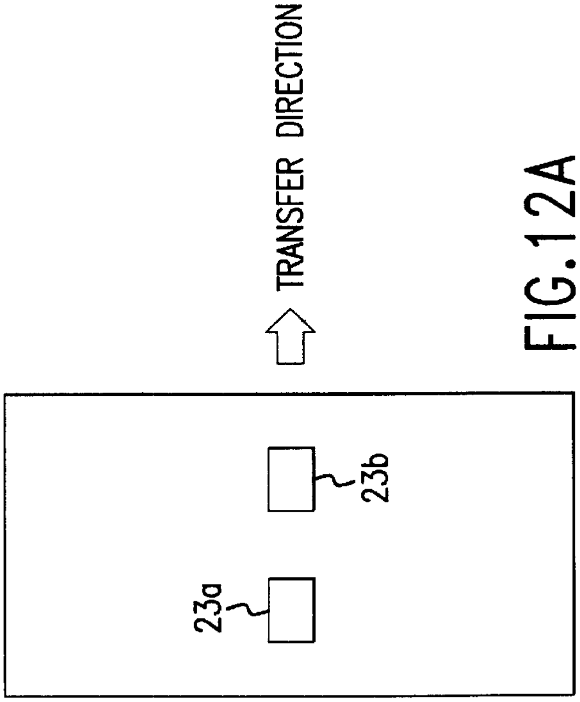
Figure 13:
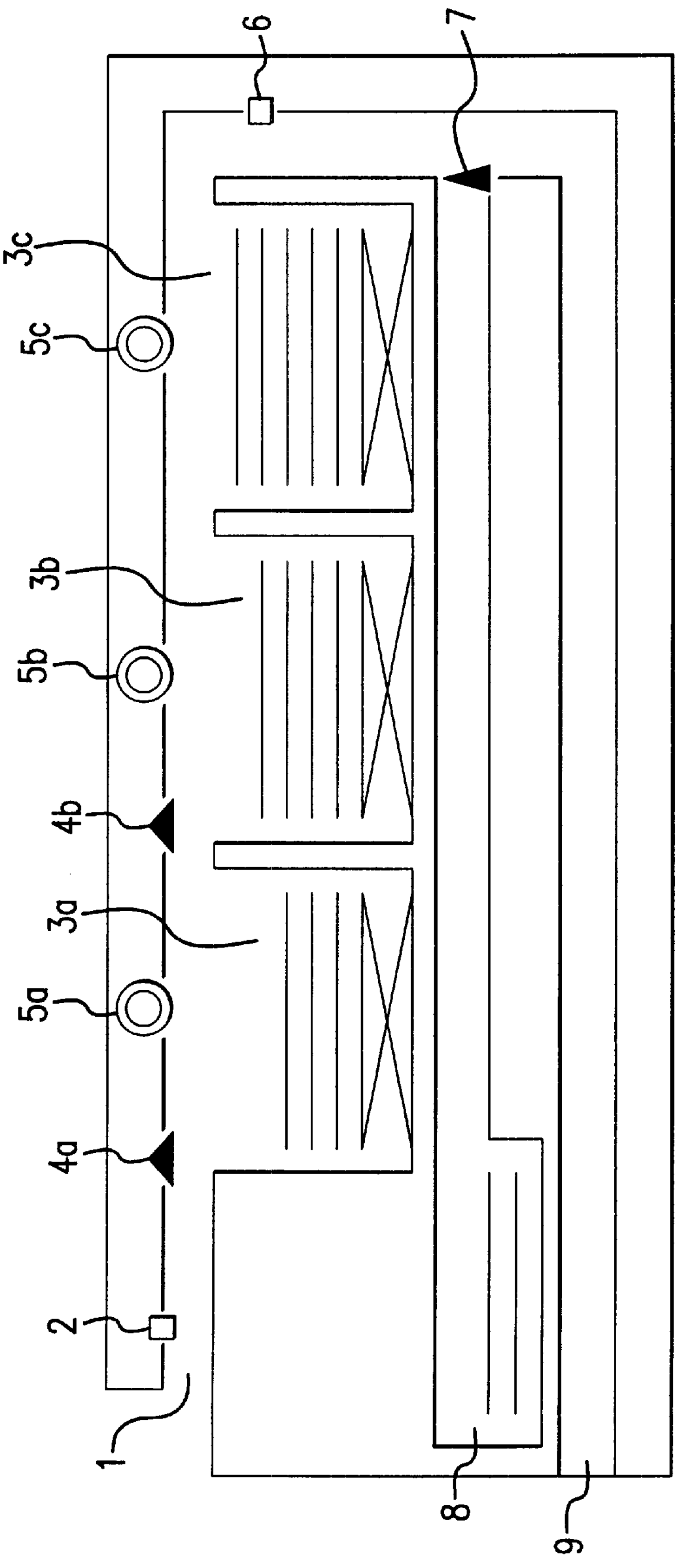
FIG. 13 PRIOR ART
FIG. 13 is an explanatory side view for showing an internal configuration of a conventional bill-processing machine.

FIGS. 12(A) to 12(C) describe a method for detecting the degraded state of the dummy bill for the close inspection. FIG. 12(A) is a plan view showing an outline of the dummy bill. FIG. 12(B) shows a variation in the detection level of the output-money identification sensor observed when the dummy bill is normal. FIG. 12(C) shows a variation in the detection level of the output-money identification sensor observed when the dummy bill is degraded. The dummy bill 23 for the close inspection has two marks 23*a*, 23*b* of a deep color printed on light-colored paper on its longitudinal center to be parallel in a transverse direction. This dummy bill 23 is assumed to be transferred in a transverse direction in the bill-processing machine 10.

In the normal state, where the dummy bill 23 is not degraded, the detection level obtained when the output-money identification sensor 17 scans the positions of the marks 23*a*, 23*b* in a transfer direction is high in a light-color portion in which the marks 23*a*, 23*b* are not printed, and is low in a deep-color portion in which the marks 23*a*, 23*b* are printed, as shown in FIG. 12(B). A sufficient difference is observed between these two levels.

In the degraded state where the dummy bill 23 has become dirty due to longtime use, the light-color portions in which the marks 23*a*, 23*b* are not printed become dark color, thereby reducing the detection level for that parts. In this manner, the degradation reduces the difference in color shade between the portions with and without the marks 23*a*, 23*b*, thereby reducing the difference in the detection level. When the degradation develops to the extent that no difference in color shade can be observed, the dummy bill 23 can not be detected during the close inspection. Thus, step S116 in FIG. 10 determines that the dummy bill is degraded by detecting that the difference in color shade has decreased down to a predetermined threshold.

As described above, according to the present invention, in the amount of the bills unloaded from the bill housing, number of the bills of the respective money types guided to the output port is subtracted from the existing-amount memory for the corresponding money types, whereas for those bills that have been circulated in the housing, this number is not subtracted from the existing-amount memory. This configuration enables the number of bills housed in the bill-processing machine to be constantly determined for the money types.

In addition, the close inspection function enables the amount of the housed bills to be constantly determined despite the change supply operation, thereby enabling the accurate cash management.

In addition, in terms of the cash management, the history of the close inspection can be stored each time reserve change is supplied and each time the person in charge is changed, thereby facilitating troubleshooting. Furthermore, the close inspection function is expected to help preventing a person in charge from engaging in wrongdoing.

While the invention has been explained with reference to the specific embodiments of the invention, the explanation is illustrative and the invention is limited only by the appended claims.

What is claimed is:

1. A method for controlling a bill-processing machine, comprising:

identifying a bill when the bill is loaded to the bill-processing machine;

increasing existing amounts in existing-amount memories for corresponding money types in the bill-processing machine as a result of the identification of the bill;

transferring the bill which has been identified to one bill housing in the bill-processing machine regardless of a kind of the bill, in which the transferred bill is stacked and retained therein;

unloading a bill from the bill housing in the bill-processing machine based on a money output instruction;

identifying the bill unloaded from the bill housing; and controlling a switching gate located in a path extending from the bill housing to be switched between an output port and a circulating path returning to the bill housing, said switching gate, if the identified bill for unloading is to be output, being switched to said output port to unload the bill from the output port and the existing amount in the existing-amount memory for a corresponding money type of the bill guided to the output port being reduced, and if the identified bill is not to be output, being switched to the circulating path to return the bill not to be output from the output port to the bill housing without changing the existing amount in the existing-amount memory, which is repeated until an indicated amount to be output has been reached.

2. A method for controlling a bill-processing machine according to claim 1, further comprising:

detecting a dummy bill housed in the bill housing operating as a separation sign for the bills while circulating the bills in the bill housing through the circulating path based on a close inspection instruction;

clearing a close inspection counter upon detection of the dummy bill;

sequentially delivering the bills from the bill housing, identifying the bills from the bill housing, and increasing a number of bills in a close inspection counter in the bill-processing machine according to the money type of the bills; and stopping the circulation of the bills from the bill housing upon detection of the dummy bill again.

3. A method for controlling a bill-processing machine according to claim 2, wherein in identifying the bill unloaded from the bill housing, when detecting an unidentified bill that can not be identified, the unidentified bill is ejected from the output port.

4. A method for controlling a bill-processing machine according to claim 3, further comprising, after the step of stopping the circulation of the bills, reloading the unidentified bill or inputting a bill of a same money type, in order to determine an amount of money existing in the bill housing.

5. A method for controlling a bill-processing machine according to claim 4, wherein in ejecting the bill from the output port, a number of the unidentified bill is counted, and in determining the existing amount in the bill housing, a number of the reloaded unidentified bill is counted down.

6. A method for controlling a bill-processing machine according to claim 5, wherein the close inspection operation is forcibly terminated if the bill that has been ejected as the unidentified bill is a medium that is not suitable for handling.

7. A method for controlling a bill-processing machine according to claim 2, wherein after stopping the circulation of the bills, a result of the close inspection counter is transferred to the existing-amount memories for the corresponding money types.

8. A method for controlling a bill-processing machine according to claim 2, wherein after stopping the circulation of the bills, a result of the close inspection counter is transferred to a close-inspection history memory in the bill-processing machine.

9. A method for controlling a bill-processing machine according to claim 2, wherein when an existing-amount readout instruction is received, a close inspection instruction for counting a number of the bills in the bill housing is issued if the number of the bills in the bill housing is uncertain.

10. A method for controlling a bill-processing machine according to claim 2, wherein in identifying the bill. loaded to the bill-processing machine or unlocated from the bill housing, it is determine whether the dummy bill is degraded.

11. A method for controlling a bill-processing machine according to claim 10, wherein in determining whether the dummy bill is degraded, a determination is based on decrease in a shade of the dummy bill.

12. A method for controlling a bill-processing machine according to claim 1, wherein the bill which has been loaded or which has been returned from the circulating path is disposed on one side of a stack of the bills in the bill housing, and the bill is unloaded from the other side of the stack of the bills in the bill housing.

13. A method for controlling a bill-processing machine according to claim 12, wherein different kinds of the bills are stacked in the bill housing.

14. A method for controlling a bill-processing machine according to claim 1, further comprising, controlling a second switching gate formed in the circulating path so that when the identified bill not to be output from the output port is a bill not to be used for change, the second switching gate is switched to a bill-recovery housing to keep the bill therein.

* * * * *